United States Patent
Löw et al.

(10) Patent No.: US 6,510,958 B2
(45) Date of Patent: *Jan. 28, 2003

(54) PLASTIC CONTAINER

(75) Inventors: Peter Andreas Löw, Rossdorf (DE); Christian Kochsmeier, Dorfmund (DE); Thomas Zapp, Dorfmund (DE); Wolfgang Pfahl, Holfheim (DE); Jerome Coulton, Frankfurt (DE)

(73) Assignee: Mannesmann VDO AG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/409,611

(22) Filed: Oct. 1, 1999

(65) Prior Publication Data

US 2002/0000439 A1 Jan. 3, 2002

(30) Foreign Application Priority Data

Oct. 2, 1998 (DE) .......................... 198 45 352

(51) Int. Cl.$^7$ ................................ B25D 6/00
(52) U.S. Cl. ................. 220/4.01; 220/4.21; 220/202
(58) Field of Search ............... 220/4.01, 4.21, 220/4.24, 202, 203.19, 203.23, 203.27

(56) References Cited

U.S. PATENT DOCUMENTS

| | | | |
|---|---|---|---|
| 3,653,537 A | | 4/1972 | Shiobara et al. |
| 4,646,772 A | * | 3/1987 | Bergsma ................. 220/202 X |
| 4,826,031 A | * | 5/1989 | Ruscitti ..................... 220/4.21 |
| 4,886,089 A | * | 12/1989 | Gabrlik et al. .......... 220/202 X |
| 4,953,583 A | * | 9/1990 | Szlaga ............... 220/203.23 X |
| 5,526,843 A | | 6/1996 | Wolf et al. |
| 5,897,016 A | * | 4/1999 | Wheaton ................ 220/4.21 X |

FOREIGN PATENT DOCUMENTS

| | | |
|---|---|---|
| DE | 3822878 A1 | 12/1988 |
| DE | 19738334 | 3/1998 |
| EP | 571876 | 12/1993 |
| EP | 619 174 A1 | 10/1994 |
| GB | 2091818 B | 7/1984 |

* cited by examiner

Primary Examiner—Steven Pollard
(74) Attorney, Agent, or Firm—Mayer, Brown, Rowe & Maw

(57) ABSTRACT

A plastic container comprising two half-shells which are produced by means of injection molding and have parts of the components integrally formed on them during the injection molding. This does away with the need for fastening said components in the plastic container, with the result that the installation process is simplified to a considerable extent. At the same time, installation errors are largely ruled out.

The plastic container is suitable for use in motor vehicles, preferably as a fuel tank.

24 Claims, 1 Drawing Sheet

PLASTIC CONTAINER

FIELD OF INVENTION

The present invention relates generally to plastic containers, and in particular a plastic fuel tank for a motor vehicle, having components arranged on the walls of the plastic container.

BACKGROUND OF INVENTION

Plastic containers designed as fuel tanks are used in modern motor vehicles. In order to enable the internal combustion engine to be supplied with fuel from the fuel tank in every situation, and on account of the complicated shapes which such a plastic container may have, a multiplicity of subassemblies, e.g., a delivery unit, suction jet pumps, valves and pressure regulators, are necessary in the interior of the plastic container.

In relation to the production process, it is possible to distinguish between two types of plastic containers. So-called blow-molded plastic containers are forced, as a freshly extruded tube, into a mold with an internal pressure, with the result that the tube positions itself against the wall of the mold. Thereafter, the components are introduced into the blow-molded plastic container, and installed therein, via the introduction opening and additional installation openings. On account of the configurations of the plastic container, the installation is often very difficult and is only possible with high outlay.

Improved installation is possible in plastic containers which are produced by means of injection molding. The plastic container is produced from two injection-molded half-shells which are welded to one another. The installation of all the components takes place in the half-shells before the welding operation. The disadvantage with this is that the components have to be fixed in their position in order to remain in said position at all times. Thus, the suction jet pumps and the delivery unit have to be fastened at the lowermost point in the plastic container, in order to allow complete emptying as far as possible and also, in the case of a minimal filling level, to ensure that the internal combustion engine is supplied reliably with fuel. The fastening often takes place by means of clamps or welding. The installation outlay and the costs for such plastic containers are thus still very high.

Thus, there is a need for a plastic container with the installation outlay required for components which are to be arranged in its interior being considerably reduced in relation to conventional containers.

Other needs will become apparent upon a further reading of the following detailed description taken in conjunction with the drawings.

SUMMARY OF THE INVENTION

In one form of the invention, the aforementioned needs are fulfilled by a plastic container comprising two injection-molded half-shells in which, during the production process, parts of components which are to be arranged in the plastic container are integrally formed on the wall of the half-shells by means of injection molding.

The advantage of these plastic containers is that, by virtue of parts of the components being attached by injection molding, they are already fastened on the plastic container, thus doing away with subsequent fastening of the components during installation. In addition to cutting back on fastening means, the installation process is thus simplified to a considerable extent and is consequently considerably more cost-effective than the installation of components in prior-art plastic containers.

A further advantage is that, as a result of the now predetermined position of the constituent parts attached by injection molding, installation errors are largely ruled out. It is also the case that the production of the plastic containers according to the invention involves less outlay than the prior-art production since a multiplicity of the parts may be produced in conjunction with cores by corresponding configuration of the injection molds.

In an advantageous configuration of the invention, the parts are designed as housings. These housings may be constituent parts of a wide range of different components, such as valves, pressure regulators, filters, level sensors or pumps. In particular when the plastic container is used as a fuel tank, it is advantageous if a splash pot or baffle plates are attached by injection molding to the container inner wall of the half-shell which forms the bottom region.

A particularly advantageous configuration is achieved when, in addition to a housing, further functional parts, e.g., valve housings with a valve seat, are attached by injection molding. In the subsequent installation, all that is then required is for the closing and actuating element to be placed in position and fixed correspondingly.

Furthermore, it is advantageous for parts to have bores for the connection of connecting lines. It is likewise possible for the parts to have connection stubs.

In a particularly advantageous manner, the parts of the components are arranged on lines which are produced by the internal gas pressure method and are integrated in the plastic container. Such parts may be valve housings or suction jet pumps. In particular, the arrangement of crash valves, which in the event of disruption avoid fluids running out of the lines, is very advantageous. This configuration makes it possible to cut back on connecting locations between individual components, which results in not inconsiderable savings in cost terms.

The configurations of the plastic container according to the invention, however, are not restricted just to parts of components which are arranged in its interior. It is likewise possible, in the case of corresponding requirements, for the parts to be arranged on the outsides of the plastic container.

The plastic container is thus particularly suitable as a fuel tank for a motor vehicle. It is also suitable, however, for all other application areas in which components are connected, as inserts or add-on elements, to the plastic container, thus, for example, as containers of a window-cleaning installation or as cooling-water tanks.

DETAILED DESCRIPTION OF THE PREFERRED EMBODIMENT

Figure 1:
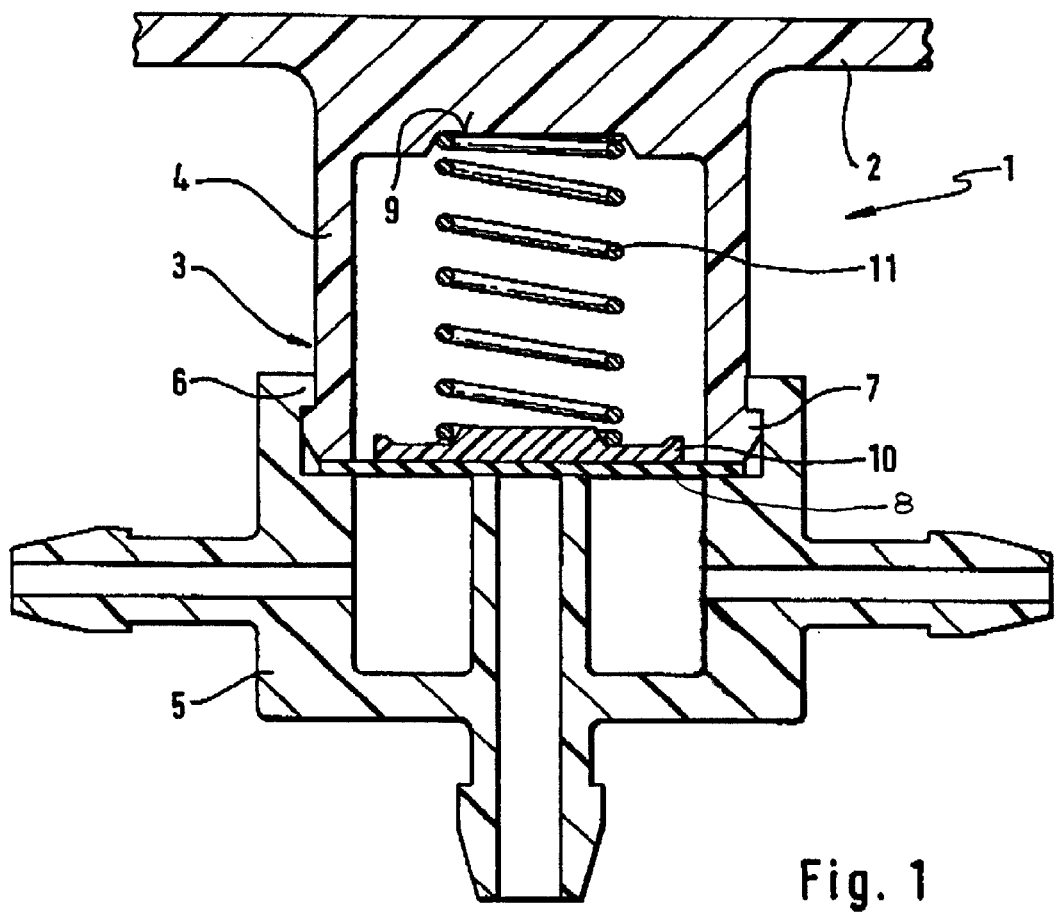
FIG. 1 shows a section through a plastic container with a pressure regulator.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated in the drawings and described below.

The plastic container 1 of which certain sections are illustrated in FIG. 1 comprises two injection-molded half-shells which form the container wall, a pressure regulator 3 being arranged on the half-shell 2, which forms the top region. The pressure regulator 3 comprises two housing parts 4, 5, which are constituent parts of the pressure regulator 3. The housing part 4 is integrally formed on the half-shell 2 in that, during injection molding of the half-shell 2, the inner mold has a recess which corresponds to the outer contour of the housing part 4. Arranged in the inner mold is a core, of which the outer contour reflects the inner contour of the housing part 4. During injection molding of the half-shell 2, the resulting cavity is also filled at the same time, with the result that the plastic which fills said cavity forms the housing part 4. The housing part 4 is arranged in relation to the housing part 5 such that latching hooks 6 engage over an annular bead 7 of the housing parts 4 and, at the same time, a diaphragm 8 is clamped between the two housing parts 4, 5. A helical spring 11 centered in a recess 9 and a retaining ring 10 prestresses the diaphragm 8.

Figure 2:
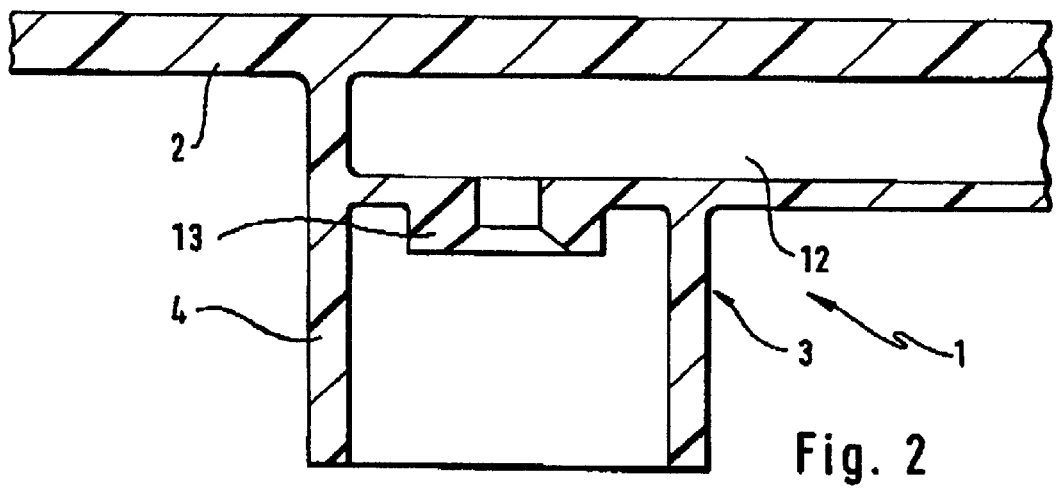
FIG. 2 shows a section through a plastic container with a valve-housing part and a line integrated in the plastic container.

The plastic container of which, once again, certain sections are illustrated in FIG. 2 has a line 12, produced by the internal gas pressure method, in its top region, which is formed by the half-shell 2. Arranged at the end of said line 12 is a housing part 4 which has been produced by a cavity which is produced by an inner mold, using a core, being filled with plastic. In this case, at the same time, a section 13 acting as a valve seat has been attached by injection molding to the housing part 4.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A plastic fuel container comprising two half-shells which are produced by injection molding and are then welded to one another, having components arranged as part of the plastic container, wherein parts of the components are integrally formed on the half-shells by means of injection molding.

2. The plastic fuel container as claimed in claim 1, wherein the parts are integrally formed on the inner walls of the half-shells.

3. The plastic fuel container as claimed in claim 1, wherein the parts are integrally formed on the outer walls of the half-shells.

4. The plastic fuel container as claimed in claim 1, wherein the part of the component is a housing.

5. The plastic fuel container as claimed in claim 4, wherein the housing is for a valve.

6. The plastic fuel container as claimed in claim 4, wherein the housing is for a regulator.

7. The plastic fuel container as claimed in claim 1, wherein the housing includes at least one functional region.

8. The plastic fuel container as claimed in claim 7, wherein the functional region is a valve seat.

9. The plastic fuel container as claimed in claim 4, wherein the housing has bores.

10. The plastic fuel container as claimed in claim 1, wherein the components include restraining means.

11. A plastic fuel container comprising:

a shell;

at least one component attached to the shell;

wherein the component includes at least one part that is integrally formed with the shell.

12. The plastic fuel container of claim 11, wherein the shell comprises two shell portions joined together.

13. The plastic fuel container of claim 12, wherein the two shell portions are produced by injection molding.

14. The plastic fuel container of claim 13, wherein the part is integrally formed on the inner walls of the shell portions.

15. The plastic fuel container of claim 13, wherein the part is integrally formed on the outer walls of the shell portions.

16. The plastic fuel container of claim 11, wherein the part is a housing.

17. The plastic fuel container of claim 16, wherein the housing is a valve housing including a valve seat.

18. The plastic fuel container of claim 16, wherein the housing is a regulator housing.

19. The plastic fuel container of claim 11, wherein the part includes a bore.

20. The plastic fuel container of claim 11, wherein the part includes a restraining member.

21. The plastic fuel container of claim 11, wherein the components are entirely enclosed by the container.

22. The plastic fuel container of claim 11, wherein the components are entirely outside of the container.

23. The plastic fuel container of claim 1, wherein the components are entirely enclosed by the container.

24. The plastic fuel container of claim 1, wherein the components are entirely outside of the container.

* * * * *